US010059862B2

(12) United States Patent
Elgimiabi et al.

(10) Patent No.: US 10,059,862 B2
(45) Date of Patent: Aug. 28, 2018

(54) HIGH MODULUS EPOXY ADHESIVES FOR SHIMMING APPLICATIONS

(71) Applicant: 3M INNOVATIVE PROPERTIES COMPANY, St. Paul, MN (US)

(72) Inventors: Sohaib Elgimiabi, Neuss (DE); Frans A. Audenaert, Zwijndrecht (BE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/900,895

(22) PCT Filed: Jun. 26, 2014

(86) PCT No.: PCT/US2014/044318
§ 371 (c)(1),
(2) Date: Dec. 22, 2015

(87) PCT Pub. No.: WO2014/210298
PCT Pub. Date: Dec. 31, 2014

(65) Prior Publication Data
US 2016/0152879 A1    Jun. 2, 2016

(30) Foreign Application Priority Data
Jun. 28, 2013 (EP) ..................................... 13174287

(51) Int. Cl.
C09J 163/04 (2006.01)
C09J 163/00 (2006.01)
C08G 59/56 (2006.01)
C08L 63/00 (2006.01)
B32B 7/12 (2006.01)

(52) U.S. Cl.
CPC ............... *C09J 163/00* (2013.01); *B32B 7/12* (2013.01); *C08G 59/56* (2013.01); *C08L 63/00* (2013.01); *B32B 2605/18* (2013.01)

(58) Field of Classification Search
CPC ............ C08G 59/5026; C08G 59/5046; C08G 59/56; C09J 163/04
See application file for complete search history.

(56) References Cited

U.S. PATENT DOCUMENTS

| 4,814,415 A * | 3/1989 | Sellstrom ............... C08G 59/60 525/504 |
| 5,641,839 A | 6/1997 | Asano |
| 6,632,872 B1 | 10/2003 | Pellerite |
| 2009/0099312 A1* | 4/2009 | Weber .............. C08G 65/33306 525/181 |
| 2010/0203249 A1* | 8/2010 | Elgimiabi ............ C08G 59/184 427/386 |

FOREIGN PATENT DOCUMENTS

| EP | 2 495 271 | 9/2012 |
| JP | S63-81118 | 4/1988 |
| JP | H3-227316 | 10/1991 |
| JP | 2008-162164 | 12/2006 |
| JP | 2011-132332 | 7/2011 |
| WO | WO 2012-121822 | 9/2012 |
| WO | WO 2012121822 A1 * | 9/2012 ......... C08G 18/5024 |

OTHER PUBLICATIONS

Durig et al (Comparisions of epoxy technology for protective coatings and linings in wastewater facilities, JPCL 2000.*
1507 Extended EP Search Report for EP13174287.6, PCT/US2014/044318, dated Jan. 28, 2014, 5pgs.
International Search Report for PCT International Application No. PCT/US2014/044318, dated Nov. 24, 2014, 4pgs.

* cited by examiner

*Primary Examiner* — Wenwen Cai
(74) *Attorney, Agent, or Firm* — Philip P. Soo

(57) ABSTRACT

Use of a curable composition comprising at least one epoxy resin and at least one epoxy curative composition as a curable shim for filling gaps between two assembled parts of an assembly, wherein the epoxy curative composition comprises at least a first and a second curative wherein the first curative is selected from a cyclic amine having at least one primary amino (—$NH_2$) group and a second curative selected from at least one polyether polyamine comprising at least one polyether unit and separated therefrom by a linking group at least one polyamine unit and further comprising at least one terminal aminoalkyl residue that is branched and comprises a primary amino group (—$NH_2$) and an alkyl branch in an α-, β- or γ-position to the primary amino group wherein the alkyl branch contains from 1 to 6 carbon atoms.

20 Claims, No Drawings

HIGH MODULUS EPOXY ADHESIVES FOR SHIMMING APPLICATIONS

CROSS REFERENCE TO RELATED APPLICATIONS

This application is a national stage filing under 35 U.S.C. 371 of PCT/US2014/044318, filed Jun. 26, 2014, which claims priority to EP Application No. 13174287.6, filed Jun. 28, 2013, the disclosure of which is incorporated by reference in its/their entirety herein.

FIELD

This disclosure relates to curable epoxy compositions that are useful as curable shimming materials of assembled parts of an assembly, as well as methods of shimming residual gaps between at least two assembled parts of an assembly and to articles comprising such assemblies.

BACKGROUND

Shims are used in many facets of assembly operations to position and fill residual gaps between assembled parts. The need for shimming is particularly acute in aerospace assembly operations due to the tight tolerance requirements and need to eliminate gaps at interfaces. Solid shims are, in some cases, made of the same material as the interfacing parts. Laminated peelable shims may be made of foil layers that can be removed one-by-one until a good fit is achieved. Curable shim materials may be particularly useful in filling irregular or tapered interfaces. A two-part liquid shim formulation has been described, for example, in US2010/0203249A1.

SUMMARY

In one aspect there is provided the use of a curable composition comprising at least one epoxy resin and at least one epoxy curative composition as a curable shim for filling gaps between two assembled parts of an assembly, wherein the epoxy curative composition comprises at least a first and a second curative wherein the first curative is selected from a cyclic amine having at least one primary amino ($-NH_2$) group and a second curative selected from at least one polyether polyamine comprising at least one polyether unit and separated therefrom by a linking group at least one polyamine unit and further comprising at least one terminal aminoalkyl residue that is branched and comprises a primary amino group ($-NH_2$) and an alkyl branch in an $\alpha$-, $\beta$- or $\gamma$-position to the primary amino group wherein the alkyl branch contains from 1 to 6 carbon atoms.

In another aspect there is provided a method of filling at least one residual gap between at least two assembled parts comprising
a) providing the curable composition
b) applying the curable composition to the gap and
c) curing the composition,
and, optionally, sanding the cured composition, and, optionally coating the cured composition with a protective coating or a paint.

In a further aspect there is provided an article comprising an assembly containing at least two assembled parts wherein at least one gap between the assembled parts is filled by a composition obtained by curing the curable composition.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

In the following there are curable compositions suitable for shimming applications, in particular gaps between assembled components that are part of an aircraft or a building. The curable compositions contain a curative composition and an epoxy composition.

The curable compositions may be provided as two-component compositions, with a first part containing the curative composition and a second part containing the epoxy composition. The two parts may be provided and kept separately and may be combined to give the curable composition.

Curative Compositions

The curative compositions contain a combination of curatives, and more precisely, contain at least a first and a second curative as described herein. According to one aspect of the disclosure, the first curative may be present in a greater amount than the second curative, based on the molar amounts or based on weight, but preferably based on molar amounts. In another aspect, the first curative may be present in an amount substantially identical to that of the second curative, based on the molar amounts or based on weight, but preferably based on molar amounts. According to still another aspect, the first curative may be present in a smaller amount than the second curative, based on the molar amounts or based on weight, but preferably based on molar amounts. The first and second curatives contain at least one primary amino groups ($-NH_2$ groups) at a terminal position. In preferred embodiments the first and second curatives contain at least two primary amino groups at a terminal position.

First Curatives

The first curatives are cyclic by which is meant that they contain at least one cyclic moiety, preferably an aliphatic cyclic moiety or an aromatic cyclic moiety. The cyclic moiety may be substituted by primary amino groups, i.e. the primary amino groups may be bonded directly to the ring. Preferably, the cyclic moiety is substituted by one or more residues carrying the primary amino group, preferably at a terminal position. That residue may be, for example, a linear or branched aminoalkyl group, preferably with the primary amino group at the terminal position. In one particular aspect of the present disclosure, the first curatives are aromatic, by which is meant that they contain aromatic groups. According to another aspect, the first curatives are not aromatic, by which is meant that they do not contain any aromatic groups.

The first curatives contain at least one, preferably at least two primary amino groups ($-NH_2$ groups) at a terminal position. Most preferred embodiments contain two primary amino groups and both are at the terminal position of the molecule. The at least one cyclic moiety is typically a fiveor six-membered ring, which may be a hydrocarbon or a heterohydrocarbon ring. The heterohydrocarbon ring typically contains one, or more than one, heteroatom selected from nitrogen and oxygen atoms. Examples of suitable first curatives include but are not limited to cyclohexanes containing one or more terminal primary amino groups and/or aminoalkyl residues with one or more terminal primary amino groups, piperazines containing one or more terminal primary amino groups and/or aminoalkyl residues with one or more terminal primary amino groups, and morpholines containing one or more terminal primary amino and/or aminoalkyl groups with terminal primary amino groups. Particular examples include but are not limited to bis or tris aminoalkyl piperazines or morpholines. Specific examples include, but are not limited to, 1-amino-3-aminomethyl-3,5,5-trimethylcyclohexane (also called isophorone diamine) and N,N-bis(3 aminopropyl) piperazine.

The first curatives may be aliphatic cyclic (poly)amines as described above or they may be adducts of such aliphatic cyclic polyamines with one or more epoxy resins, with the proviso that the aliphatic cyclic polyamines are used in molar excess to ensure the adducts contain at least two primary amine groups, preferably at a terminal position of the adduct. Preferably, the epoxy resin used to form the adduct is the same or a similar one to one of the epoxy resins used in the epoxy component. For example, the first curative is a diamine and is reacted with an epoxy resin having two glycidyl groups to form an adduct, the first primary curative may be used in a molar ratio of diamine to epoxy resin greater than or equal to 2:1 to form an amine-containing adduct having two amino groups. A molar excess of the amine is often used so that the first primary curing agent includes both the amine-containing adduct plus free (non-reacted) amine curative. For example, the molar ratio of the amine curative to epoxy resin with two glycidyl groups can be greater than 2.5:1, greater than 3:1, greater than 3.5:1, or greater than 4:1.

Second Curatives

The second curatives are polyether polyamines containing at least one polyamine and one polyether unit separated from each other, for example, by a linking unit. The linking unit may contain an amido (—HN(C=O)—) functionality. The polyamino, polyether or amido units and combinations thereof may be repeating units. Therefore, the second curatives may also be referred to as polyether (poly)amido polyamines.

The polyamino units may be polyalkylene units, for example those represented by the general formula —[$R^1$NH]$_n$— wherein $R^1$ represents a substituted or unsubstituted, branched or unbranched bivalent group chosen from alkylene or arylene, preferably alkylene, and in particular ethylene, n-propylene, iso-propylene, n-butylene, iso-butylene, tert-butylene or combinations thereof of, for example the polyether unit may contain ethamino (—[$CH_2CH_2NH$]—) and propamino (e.g. —[$CH_2CH_2CH_2NH$]—) units, and n is an integer greater than 1. For example n can be an integer from 2 to 200, preferably from 2 to 150, more preferred from 3 to 10.

The polyether units may be represented by the general formula —[$R^2O$]$_n$— wherein $R^2$ represents a substituted or unsubstituted, branched or unbranched bivalent group chosen from alkylene or arylene, preferably alkylene, and in particular ethylene, n-propylene, iso-propylene, n-butylene, iso-butylene, tert-butylene or combinations thereof of, for example the polyether unit may contain ethoxy (—[$CH_2CH_2O$]—) and propoxy (e.g. —[$CH_2CH_2CH_2O$]—) units, and n is an integer greater than 1. For example n can be an integer from 2 to 200, preferably from 2 to 150, more preferred from 3 to 10.

The second curatives further comprise at least one terminal primary amino group, more preferably two terminal primary amino groups that are sterically hindered. In preferred embodiments the sterically hindered amino group is sterically hindered by a $C_1$ to $C_6$ alkyl branch. Preferably the alkyl branch is in α-, β- or γ-position to the primary amino group. Therefore, the second curatives can also be referred to as branched compounds. The alkyl branch may be linear or branched or cyclic. The α-, β- or γ-position to the primary amino group as referred to herein indicate the carbon atom to which the —$NH_2$ group is bonded (alpha position); the carbon adjacent to the carbon atom to which the —$NH_2$ group is bonded (beta position); and the carbon atom adjacent to the carbon at the beta position (gamma position). In preferred embodiments the second primary curatives contain at least one termination selected from iso-propylamino-terminations, sec-butylamino-terminations or tert-butylamino-terminations.

The second primary curatives are preferably non-aromatic.

Suitable second curatives according to the present disclosure are obtainable by a two-step reaction of a polyetheramine with an alkyl acrylate and a polyalkyleneimine, whereas the polyetheramine and the polyalkyleneimine have at least one primary or secondary amine group.

The first step comprises the reaction of the polyetheramine with the alkyl acrylate and the second step comprises the reaction of the polyalkyleneimine with the product of the first step as described in EP 2 495 271 A1 to F. Audenaert, which is incorporated herein by reference. The resulting amine may be subjected again to a reaction with an alkyl arylate according to the first step followed by a reaction a polyalkyleneimine, a polyetheramine or a mixture thereof to introduce repeating polyether units or polyamine units.

The first reaction step may be conducted via an aza-Michael addition and/or the second step may be conducted as a condensation reaction. The reaction can be represented by the following scheme:

Step 1

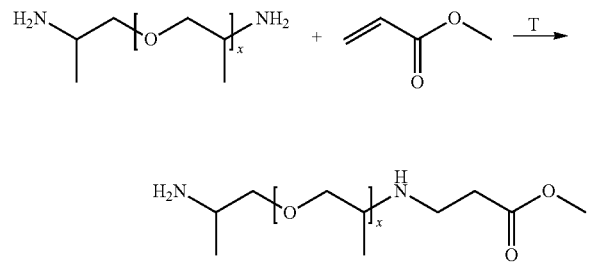

Step 2

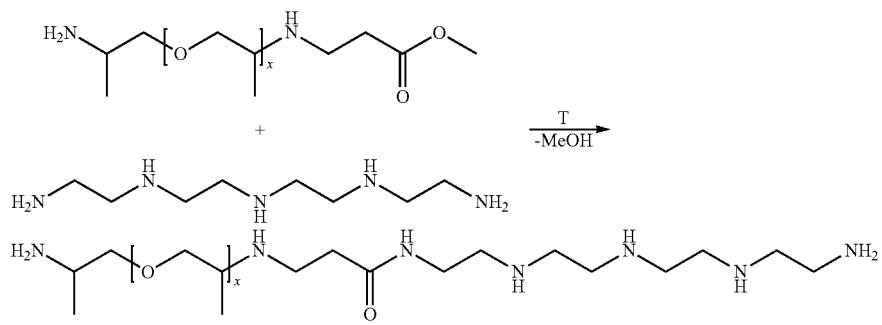

According to a preferred embodiment of the current invention, the polyetheramine has the general formula (Ia) or (Ib)

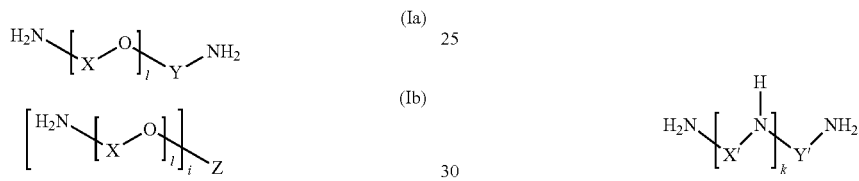

with X, Y being independently a substituted or unsubstituted, branched or unbranched bivalent group chosen from alkylene or arylene, in particular ethylene, n-propylene, iso-propylene, n-butylene, iso-butylene, tert-butylene, phenylene, tolylene or xylylene, Z being a substituted or unsubstituted, branched or unbranched i-valent alkyl, aryl-rest, i being an integer from 1 to 5, preferably 2 or 3, and l being an integer from 2 to 200, preferably from 2 to 150, more preferred from 3 to 10. It is understood that X can stand for different groups in the same molecule. For example X can be ethyl and iso-propyl so that the polyetheramine has a polyether backbone of the type (Et-O)n-(iProp)m.

Especially useful polyetheramines include those available under the trade designation JEFFAMINE from Huntsman. These polyetheramines can be linear, branched or may also have a comb-like structure. Examples include the linear JEFFAMINE D Series, like D-230, D-400, D-2000 and D-4000, whereas the number gives the approximate molecular weight of the respective substance. Other examples include the JEFFAMINE ED Series which differ from the JEFFAMINE D Series in that the polyetheralkylene chain is composed from two different ether groups, namely ethyl ether and isopropyl ether groups. According to a preferred embodiment the polyetheramine comprises at least one end-standing (i.e. terminal) iso-propylamine, iso-butylamine or tert-butylamine group.

Examples of suitable alkyl acrylates include those having an alkyl rest of up to 10 carbon atoms, preferably 1 to 5 carbon atoms. More preferably the alkyl rest is a methyl or an ethyl group.

Suitable examples for polyalkyleneimine suitable in the reaction include polyalkyleneimines having the general formula (II):

with X' and Y' being independently a branched or unbranched bivalent group chosen from alkylene or arylene, in particular ethylene, n-propylene, i-propylene, butylene, i-butylene, phenylene, tolylene or xylylene and k being an integer from 2 to 100, preferably from 3 to 10.

In a preferred embodiment the mole ratio of polyetheramine:alkyl acrylate ranges from 10:1 to 1:4, in particular from 2:1 to 1:3 and/or the ratio of alkyl acrylate:polyalkyleneimine ranges from 5:1 to 1:1, in particular from 3:1 to 1:1.

When the ratios are chosen as non-integers, the reaction will result in mixtures of differently substituted molecules. For example a ratio of polyetheramine:alkyl acrylate of 1:1.2 leads to an adduct-mixture, in which about 80% of the polyetheramine is adducted with one molecule of alkyl acrylate and the remaining 20% with two molecules of alkyl acrylate, without considering possible side-reactions. This leads to mixtures of differently substituted polyether-amido-amines. The properties of the resulting curing agent can be flexibly modified by varying the ratios of the reactants.

It is understood that mixtures of polyetheramines or polyalkyleneimines may also be used, which however result in complex reaction mixtures. Nevertheless also such complex reaction mixtures may be used.

In particular embodiments the second curative is represented by a structure selected from formulas (III)-(V). The polyether polyamido polyamine according to formula (III) is represented by the general structure:

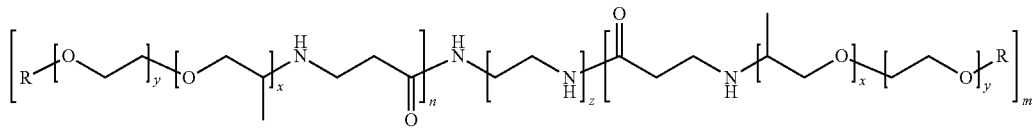

with x being an integer from 1-200, y being an integer from 0-200 and z being an integer from 1 to 100. R represents independently a single valent alkyl rest with a primary amino group. R typically contains 1 to 10 carbon atoms. The alkyl rest may be linear or branched but at least one residue R is branched and comprises an alkyl branch in an α-, β- or γ-position to the primary amino group wherein the alkyl branch contains from 1 to 6 carbon atoms. Suitable examples for branched amino rests include iso-propylamine, sec-butylamine or tert-butylamine rests. In formula (III) m and n are integers including 0 and are meant to indicate that the particular moiety may be a repeating unit. It is understood that in case of repeating units (i.e. n or m is greater than 1) R is replaced in the repeating units by R' which is identical to the terminal end group R except that it is —NH— analogue of R. For example, if R is $NH_2$—$CH_2$—$CH_2$— at the terminal position R' will be —NH—$CH_2$—$CH_2$—. In case n or m represent 0, the respective n or m unit is replaced by an H atom. In any case n and m cannot be 0 at the same time. In preferred embodiments n and m represent 1.

The polyether (poly)amido polyamine according to formula (IV) is represented by the general structure:

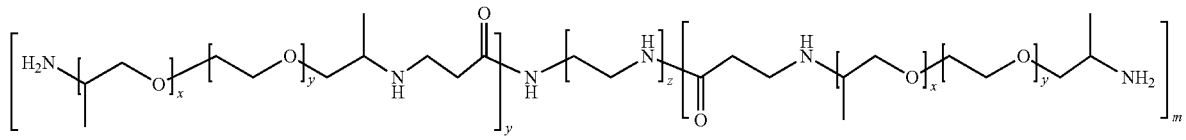

with x, y, z, m, n having a meaning as described above for formula (III). In case of repeating units the terminal —$NH_2$ group is replaced in the repeating units by an —NH— group.

The polyether polyamine according to formula (V) is represented by the general structure:

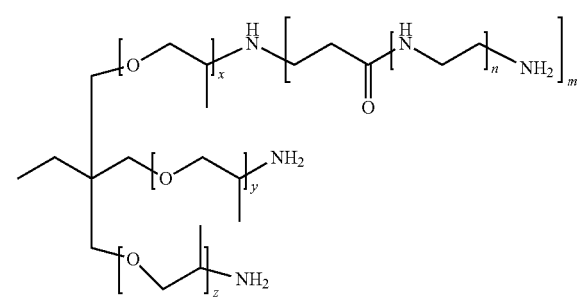

with x, y, z being an integer of 0-200, and n being an integer of 1-100 and m having a meaning as described above in formula (III), except that m is not 0. In case of repeating units —$NH_2$ is replaced in the repeating unit by —NH—.

The curable compositions provided herein usually contain at least 3 weight percent of the curative composition (combination of first and secondary primary curatives) based on a total weight of the curable composition. For example, the total curable composition can contain at least 3 weight percent, at least 5 weight percent, or at least 10 weight percent of the curative composition. The curable composition typically includes up to 35 weight percent, up to 25 weight percent, up to 20 weight percent, or up to 15 weight percent of the curative composition. For example, the curable composition can contain 3 to 35 weight percent, 3 to 25 weight percent, 3 to 20 weight percent, 3 to 15 weight percent, 3 to 10 weight percent, 5 to 35 weight percent, 5 to 25 weight percent, 5 to 20 weight percent, or 5 to 15 weight percent of the curative composition.

Epoxy Compositions

The epoxy curatives may be combined with an epoxy component to provide a curable composition. The epoxy components comprise one or more aromatic epoxy resins.

Aromatic Epoxy Resins

The aromatic epoxy resins contain at least one epoxy functional group (i.e., oxirane group) per molecule. As used herein, the term oxirane group refers to the following divalent group according to Formula (VI):

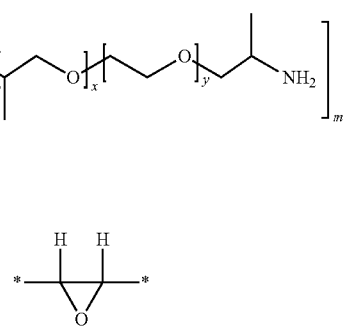

The asterisks denote a site of attachment of the oxirane group to another group. If the oxirane group is at the terminal position of the epoxy resin, the oxirane group is typically bonded to a hydrogen atom (i.e. * is replaced by H). This terminal oxirane group is often part of a glycidyl ether group (formula (VII)):

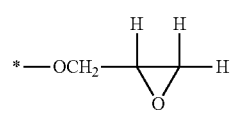

The epoxy resin often has at least one oxirane group per molecule and often has at least two oxirane groups per molecule. For example, the epoxy resin can have 1 to 10, 2 to 10, 1 to 6, 2 to 6, 1 to 4, or 2 to 4 oxirane groups per molecule. The oxirane groups are usually part of a glycidyl group and the resins are glycidyl ethers.

Epoxy resins can be a single material or a mixture of materials selected to provide the desired viscosity characteristics before curing. If the epoxy resin is a mixture of materials, at least one of the epoxy resins in the mixture is typically selected to have at least two oxirane groups per molecule. For example, a first epoxy resin in the mixture can have two to four oxirane groups and a second epoxy resin in the mixture can have one to four oxirane groups. In some of these examples, the first epoxy resin is a first glycidyl ether with two to four glycidyl groups per molecule and the second epoxy resin is a second glycidyl ether with one to four glycidyl groups per molecule.

The epoxy resins are preferably aromatic. This means the portion of the epoxy resin molecule that is not an oxirane group (i.e., the epoxy resin molecule minus the oxirane groups) may contain one or more aromatic groups.

The weight average molecular weight is usually at least 100 grams/mole, at least 150 grams/mole, at least 175 grams/mole, at least 200 grams/mole, at least 250 grams/mole, or at least 300 grams/mole. The weight average molecular weight can be up to 50,000 grams/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 gram/mole, in the range of 100 to 1,000 grams/mole, or in the range of 200 to 1,000 grams/mole.

Suitable epoxy resins are typically a liquid at room temperature (e.g., about 20° C. and 1 bar). However, epoxy resins that can be dissolved in a suitable solvent also can be used. In most embodiments, the epoxy resin is a glycidyl ether. Exemplary glycidyl ethers epoxy resins can be of Formula (VIII):

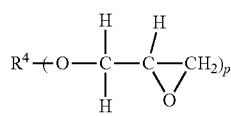

In formula (VIII), group $R^4$ is a p-valent moiety that is aromatic or contains one or more aromatic units, typically repeating units. Although the variable p can be any suitable integer greater than or equal to 1, p is often an integer in the range of 2 to 4.

The epoxy resins can be prepared, for example, by reacting an aromatic compound having at least two hydroxyl groups with an excess of epichlorohydrin to generate the glycidyl ether functionality. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzophenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Many commercial glycidyl ether epoxy resins include glycidyl ether epoxy resins based on bisphenol A or bisphenol F.

Examples of trihydric phenols include but are not limited to tris(hydroxylphenyl)methane.

In some embodiments the epoxy resin is an epoxy novolac. Epoxy novolacs are the reaction product of an epoxy group-introducing agent, such as for example epichlorohydrine, with a condensation product of a mono-di or polyhydric phenol (which may be alkylsubstituted (e.g. cresol) or non-substituted) and an aldehyde, such as for example, formaldehyde. Typical epoxy novolacs are polymers containing glycidyl ether groups and further comprising repeating units derived from bisphenol F or another reaction product of a phenol with an aldehyde. The phenol may be monohydric, dihydric or trihydric and may be non-substituted or alkyl substituted.

Some commercially available diglycidyl ether epoxy resins of Formula (VIII) are derived from bisphenol A. Examples include, but are not limited to, those available under the trade designation EPON (e.g., EPON 828, EPON 872, and EPON 1001) from Hexion Specialty Chemicals, Inc. in Houston, Tex., those available under the trade designation DER (e.g., DER 331, DER 332, and DER 336) from Dow Chemical Co. in Midland, Mich., and those available under the trade designation EPICLON (e.g., EPICLON 850) from Dainippon Ink and Chemicals, Inc. in Chiba, Japan. Other commercially available diglycidyl ether epoxy resins are derived from bisphenol F. Examples include, but are not limited to, those available under the trade designation DER (e.g., DER 334) from Dow Chemical Co. and those available under the trade designation EPICLON (e.g., EPICLON 830) from Dainippon Ink and Chemicals, Inc.

Glycidyl ethers of trihydric phenols (for example trishydroxyphenyl methane) are commercially available, for example, under the trade designation TACTIX from Ciba Specialty Chemicals, Switzerland.

In a preferred embodiment of the present disclosure the epoxy resin is selected from a bisphenol A glycidylether, bisphenol F diglycidyl ether and combinations thereof and blends thereof. In another preferred embodiment the epoxy resin is a tris(hydroxyphenyl)methane glycidyl ether. In yet another preferred embodiment the epoxy composition comprises a combination of a tris(hydroxyphenyl)methane glycidyl ether and a bisphenol A glycidyl ether and/or bisphenol F glycidyl ether.

The epoxy composition often contains a mixture of epoxy resins. For example, the epoxy resins can be selected to be a mixture that provides the desired viscosity or flow characteristics prior to curing. The mixture may be a mixture of aromatic epoxy resins or a mixture of one or more aromatic resin and one or more non-aromatic epoxy resin.

The curable composition typically includes at least 20 weight percent epoxy resin based on a combined weight of the first part and the second part of the two component compositions (i.e., based on a total weight of the curable composition). For example, the curable composition can include at least 25 weight percent, at least 30 weight percent, at least 40 weight percent, or at least 50 weight percent epoxy resin. The curable composition often includes up to 90 weight percent epoxy resin. For example, the curable composition can include up 80 weight percent, up to 75 weight percent, up to 70 weight percent, up to 65 weight percent, or up to 60 weight percent epoxy resin. Some exemplary curable compositions contain 20 to 90 weight percent, 20 to 80 weight percent, 20 to 70 weight percent, 30 to 90 weight percent, 30 to 80 weight percent, 30 to 70 weight percent, 30 to 60 weight percent, 40 to 90 weight percent, 40 to 80 weight percent, 40 to 70 weight percent, 50 to 90 weight percent, 50 to 80 weight percent, or 50 to 70 weight percent epoxy resin.

Additives

The curable compositions may contain additives. The additives may be part of the curative composition or part of the epoxy resin composition or both. Additives that are reactive with epoxy resins are typically added to the curative compositions and additives that may be reactive with the curing agents may be added to the epoxy-resin composition to avoid premature reactions. Additives that or not reactive with the epoxy resins or curing agents can be part of either the curative compositions or the epoxy resin compositions or both. Typical additives include further curing agents, curing catalysts, reactive diluents, fillers, desiccants, pigments, adhesion promoters, oil-replacing agents, wetting agents and toughening agents, fire retardants and thiotropic agents. Useful amounts may be those indicated by the respective suppliers or as known in the art.

Further Curing Agents

The curable compositions may comprise further curing agents. The further curing agents may comprise secondary curatives. These secondary curatives are often imidazoles or salts thereof, imidazolines or salts thereof, or phenols substituted with tertiary amino groups. Examples include those as described, for examples under Formula (IXa) in EP 2495271 A1 to F. Audenaert. An exemplary secondary curative is tris-2,4,6-(dimethylaminomethyl)phenol that is commercially available under the trade designation ANCAMINE K54 from Air Products Chemicals, Inc. of Allentown, Pa., USA.

The optional secondary curative can be present in the first part of the curable composition with the epoxy resin or in the second part of the curable composition with the primary curing agents. The amount of the secondary curative is typically up to 6 weight percent, up to 5 weight percent, or up to 4 weight percent base on a total weight of the curable composition.

Reactive Diluents:

The reactive diluents tend to lower the viscosity of the epoxy resin mixture and is an epoxy resin having either a branched aliphatic backbone that is saturated or a cyclic backbone that is saturated or unsaturated. Examples of reactive diluents include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER 107 from Hexion Specialty Chemicals in Columbus, Ohio and under the trade designation EPODIL 757 from Air Products and Chemical Inc. in Allentonwn, Pa.

Other reactive diluents have only one functional group (i.e., oxirane group) such as various monoglycidyl ethers. Some exemplary monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some exemplary monoglycidyl ethers are commercially available under the trade designation EPODIL from Air Products and Chemical, Inc. in Allentown, Pa. such as EPODIL 746 (2-ethylhexyl glycidyl ether), EPODIL 747 (aliphatic glycidyl ether), and EPODIL 748 (aliphatic glycidyl ether). In most embodiments, the epoxy resin includes one or more glycidyl ethers and does not include epoxy alkanes and epoxy esters. Epoxy alkanes and epoxy esters can be included in the curable compositions, however, as oil displacing agents.

Reactive diluents may be added in amounts suitable to create the desired viscosity or flow properties of the curable composition. Typical amounts include from about 1 to about 12% by weight based on the total weight of the epoxy component.

Fillers:

Fillers can be added to the first part (epoxy component) of the curable composition, to the second part (epoxy curative part) of the curable composition, or to both the first part and the second part of the curable composition. Fillers are often added to promote adhesion, to improve corrosion resistance, to control the rheological properties of the composition, to reduce shrinkage during curing, to accelerate curing, to absorb contaminants, to improve heat resistance, to provide volume to the composition or for a combination thereof. The fillers can be inorganic materials, organic materials, or composite materials containing both inorganic and organic materials. The fillers can have any suitable size and shape. Some fillers are in the form of particles with spherical, elliptical, or platelet shapes. Other fillers are in the form of fibers.

Some fillers are inorganic fibers such as fiber glass (e.g., glass wool and glass filament), mineral wool (e.g., rock wool and slag wool), and refractory ceramic fibers. Some exemplary inorganic fibers include a mixture of $SiO_2$, $Al_2O_3$, or a combination thereof. The inorganic fibers can further include CaO, MgO, $Na_2O$, $K_2O$, $Fe_2O_3$, $TiO_2$, other oxides, or mixtures thereof. Exemplary inorganic fibers are commercially available under the trade designation COATFORCE (e.g., COATFORCE CF50 and COATFORCE CF10) from Lapinus Fibres BV in Roermond, The Netherlands. Other exemplary inorganic fibers can be prepared from wollastonite (i.e., a calcium silicate).

Other fillers are organic fibers such as aramid fibers and polyolefin fibers such as polyethylene fibers. These organic fibers can be untreated or treated to change their hydrophobic or hydrophilic character. For example, some organic fibers are specially treated to make them hydrophobic or to increase their hydrohobicity. The fibers can be fibrillated. Exemplary polyolefin fibers include high-density polyethylene fibers such as those available under the trade designation SYLOTHIX (e.g., SYLOTHIX 52 and SYLOTHIX 53) from EP Minerals in Reno, Nev., those available under the trade designation ABROTHIX (e.g., ARBOTHIX PE100) from EP Minerals, those available under the trade designation SHORT STUFF (e.g., SHORT STUFF ESS2F and SHORT STUFF ESS5F) from MiniFIBERS, Inc. in Johnson City, Tenn., and those available under the trade designation INHANCE (e.g., INHANCE PEF) from Inhance/Fluoro-Seal, Limited in Houston, Tex. Exemplary aramid fibers are commercially available under the trade designation INHANCE (e.g., INHANCE KF) from Inhance/Fluoro-Seal, Ltd. in Houston, Tex.

Other suitable fillers include silica containing materials, for example silica-gels, silicates, fumed silica, fused silica. Fumed silica may also act as thixotropic agent. Preferred fillers include silica, for example fumed silica, fused silica and a combination thereof. Other fillers include, but are not limited to calcium phosphates, calcium molybdates, calcium carbonate, glass microspheres, hollow glass microspheres, polymeric microspheres, and hollow polymeric microspheres, clays such as bentonite, organo-clays.

Any of these filler can be surface modified to make them more compatible with the curable or cured composition.

Exemplary fillers include a mixture of synthetic amorphous silica and calcium hydroxide that is commercially available from W.R. Grace in Columbia, Md. under the trade designation SHIELDEX (e.g., SHIELDEX AC5), a fumed silica treated with polydimethylsiloxane to prepare a hydrophobic surface that is available from Cabot GmbH in Hanau, Germany under the trade designation CAB-O-SIL (e.g., CAB-O-SIL TS 720), a hydrophobic fumed silica available from Degussa in Dusseldorf, Germany under the trade designation AEROSIL (e.g., AEROSIL VP-R-2935), glass beads class IV (250 to 300 micrometers) from CVP S.A. in France, and epoxysilane-functionalized (2 wt %) aluminium trihydrate available under the trade designation APYRAL 24 ESF from Nabaltec GmbH in Schwandorf, Germany.

The curable composition can contain any suitable amount of the filler. Filler may be present in the first part or the second part or in both parts. In many embodiments, the curable composition contains from about 10 to about 50 weight percent filler based on a total weight of the curable composition. For example, the amount can be in the range of 0.5 to 50 weight percent, in the range of 10 to 40 weight percent, in the range of 15 to 35 weight percent based on the weight of the first part. For example, the amount can be in the range of 0.5 to 50 weight percent, in the range of 10 to 40 weight percent, in the range of 15 to 35 weight percent based on the weight of the second part.

Desiccants:

Molecular sieves may be used, for example, as a moisture controlling agent.

Pigments:

Pigments are included to provide colour to the composition. Examples of pigments include ferric oxide, brick dust, carbon black, titanium oxide and the like.

Adhesion Promoter:

Exemplary adhesion promoters include, but are not limited to, various silane compounds. Some silane compounds that are suitable for adhesion promoters have amino groups or glycidyl groups that can react with one or more components in the curable composition. Other exemplary adhesive promoters include various chelating agents such as those described in U.S. Pat. No. 6,632,872 (Pellerite et al.) and various chelate-modified epoxy resins such as those available from Adeka Corporation in Tokyo, Japan under the trade designation EP-49-10N and EP-49-20.

Oil-Displacing Agents and Wetting Agents:

In particular when used for metal surface, the compositions may contain oil-displacing agents, which improve the wetting of the composition on such substrates. The oil displacing agent can be added to the first part of the curable composition containing the epoxy resin, to the second part of the curable composition containing the curing agent, or to both the first part and the second part. The oil displacing agent can be added to promote adhesion between the cured composition and the surface of a substrate that is contaminated with a hydrocarbon-containing material. Wetting agents may improve the dispersion of the samples on the substrate. Typical oil-displacing agents and wetting agents include organic esters, for example phosphate esters, glycidyl esters and the like.

Toughening Agents

The compositions may further comprise toughening agents. Toughening agents are polymers, other than the epoxy resins, capable of increasing the toughness of cured epoxy resins compared to the same composition not containing them (the difference in amount in such comparison studies is made up by the epoxy resin) and which are otherwise treated identically. Typical toughening agents include, for example, core-shell polymers or butadiene-nitrile rubbers.

Fire Retardants:

Typical fire retardants include phosphorous-containing materials selected from a group comprising, for example, elemental red phosphorous, melamine phosphate, dimelamine phosphate, melamine pyrophosphate and inorganic phosphinates such as, for example, aluminium phosphinates. The fire-resistant system may also include a boron-containing material, such as those selected from the group consisting of barium metaborates, calcium metaborates, zinc metaborates and mixtures thereof.

Making and Applying Curable Compositions

The curable compositions are typically two-component formulations, comprising a an epoxy resin part and separated therefrom an epoxy curative part. The parts are separated from each other to avoid premature curing and are combined to obtain the curable composition by mixing the epoxy curative compositions and the epoxy component. The mixing preferably yields a homogeneous mixture. The components are typically mixed prior to the application of the curable composition. The amount of each part included in the mixture can be selected to provide the desired molar ratio of oxirane groups to amine hydrogen atoms and the desired molar ratio of reactive liquid modifier to amine hydrogen atoms.

When the curing reaction occurs at room temperature, the ratio of amine hydrogen equivalent weight of the curing agents to epoxy equivalent weight is often at least 0.5:1, at least 0.8:1, or at least 1:1. The ratio can up be to 2:1 or up to 1.5:1. For example, the ratio can be in the range of 0.5:1 1 to 2:1, in the range of 0.5:1 to 1.5:1, in the range of 0.8:1 to 2:1, in the range of 0.8:1 to 1.5:1, in the range of 0.8:1 to 1.2:1, in the range of 0.9:1 to 1.1:1, or about 1:1. The ratio is often selected so that there is sufficient amine curing agent present to react with both the epoxy resin and the reactive liquid modifier if present.

If the curing temperature occurs at elevated temperatures (e.g., temperatures above 100° C. or above 120° C. or above 150° C.), however, a lower amount of the amine curing agent is often used. The amount of the curing agent in the curable adhesive or coating composition is often present in a sufficient molar amount to react with the reactive liquid modifier and with a portion of the epoxy resin. For example, the ratio of amine hydrogen equivalent weight to epoxy equivalent weight is often less than 1:1 such in the range of 0.2:1 to 0.8:1, in the range of 0.2:1 to 0.6:1, or in the range of 0.3:1 to 0.5:1. Any epoxy resin that is not reacted with the curing agent tends to undergo homopolymerization at elevated temperatures.

The curable compositions are suitable as shim materials, in particular as shim materials for components of an aircraft. They are in particular useful for shimming (e.g. filling) residual gaps between assembled parts of an assembly. Such assembly may be formed by directly or indirectly mounting at least two parts. The gaps may typically arise at the interfaces of the assembled components. Directly mounting means the components of the assembly are attached to each other, for example by mechanical means or chemical means like adhesive bonds. The components may also be indirectly mounted, for example a first and a second component of an assembly are not attached to each other directly but, for example, by a third component to which the first and second component are attached.

In many embodiments the curable shim compositions will demonstrate characteristics prior to cure including low viscosity such as may be suitable for injection or application by syringe. Typically, the compositions show a low degree of sag or creep upon application.

In many embodiments the curable shim composition can be applied as liquid, paste, spray. In some embodiments the curable shim compositions can be applied as solid that can be liquefied upon heating.

The curable composition is applied to the gap and then subjected to curing. In many embodiments the curable shim compositions provided herein will cure fully at room temperature in twenty-four to forty-eight hours and can be sanded or drilled four hours after application. In many embodiments the curable shim compositions will have about 3 hours pot life (time for positioning and adjusting) and may be cured at an accelerated rate with application of mild heat, typically curing in less than 30 minutes at 70° C.

The cured compositions show good mechanical properties that are desirable for shimming applications, in particular for shimming applications in the automotive and aircraft industry. For example, the cured shim compositions may have a cohesive strength, as measured by overlap shear strength, of at least 2500 psi (17.2 MPa). For example, overlap shear strength can be at least 3000 psi (20.7 MPa) or at least 3200 psi (22.1 MPa).

Suitable substrates onto which the curable shim compositions may be applied include metals (e.g., steel, iron, copper, aluminum, or alloys thereof) and composites. The composites typically contain one or more type of fibers embedded in a resin. Typical fibers include carbon fibers, glass fibers and combination thereof. The resin may be an epoxy resin, a phenolic resin, a polyamide resin or combinations thereof or other resins. Preferably, the compositions are applied to fill residual gaps between composite materials, most preferably fiber-reinforced resins, including for example but not limited thereto, glass fiber reinforced epoxy composites.

In many embodiments the curable shim compositions will demonstrate characteristics after cure including: good compression strength properties at room temperature and elevated temperatures (20 to 120° C.). For example, the cured compositions may have a compression strength of greater than 2,500 MPa at 20° C., greater than 1,500 MPa at 80° C. and greater than 500 MPa at 120° C. The cured compositions typically show good resistance to most solvents, oils, hydraulic fluids, and the like.

Commercial curable shim formulations are used, for example, to shim gaps between assembled parts that form a component of an aircraft. Such components may be parts of the wing of an aircraft, for example flaps of a wing or tail fin, or parts of a flap for a wing or a tail fin. Due to the strict requirements and low tolerances in aircrafts the components are typically precisely machined to form-fit. However, a perfect form-fit cannot always be guaranteed and residual gaps between the assembled components have to be shimmed. Commercial curable shim formulations are typically applied to gaps in components for aircrafts, in particular those listed above, having a width of up to about 0.7 mm to still satisfy the mechanical stability requirements of airplane manufacturers. An advantage of the curable shim formulations provided herein is that cured compositions with very high compressive strength can be obtained. This may allow shimming of larger gaps between the assembled parts of components of aircrafts as described above, for example, gaps having a width of up to about 3 mm. Another advantage of the curable shim formulations provided herein is that the cured compositions maintain high compressive strength also at elevated temperatures.

In other embodiments the gaps are between assembled parts of a building or components thereof. For example the compositions may be used to shim gaps in components of wind energy plants or stations, for example rotor blades or towers of a wind turbine.

Objects and advantages of this invention are further illustrated by the following examples, but the particular materials and amounts thereof recited in these examples, as well as other conditions and details, should not be construed to unduly limit this invention.

EXAMPLES

The following two component formulations were prepared, cured and tested for their properties. The B part (epoxy part) of the two component parts contained the ingredients as shown in table 1. Three different hardening parts (parts A) of the two component compositions were prepared differing only in the curative agents used. The ingredients of the A parts are shown in table 2. Part B and part A were then mixed (Mix ratio B/A=2/1 by vol.) and applied to test strips and cured at ambient conditions (23° C.) for 7 days (168 hours) and tested for the properties as shown in table 3.

TABLE 1

Ingredients of B part

| Material | Weight % | Function |
|---|---|---|
| Tactix 742 | 34 | Tris(hydroxylphenyl) methane based epoxy resin available from Ciba Specialty Chemicals, Switzerland |
| Epikote 828 | 10 | Epoxy resin based on the reaction product of bisphenol A and epichlorohydrine, available from Momentive Specialty Chemicals Inc |
| Additives | 56 | (filler, adhesion promoter, pigments, and diluents (heloxy modifier 6% wt and toughening agent 10% wt) |
| Total | 100 | |

TABLE 2

Ingredients of A part

| Raw Material | A1 | A2 | A3 | Function |
|---|---|---|---|---|
| BAPP - Adduct * | 44 | 44 | 44 | 1st curative |
| Branched polyether polyalkylene diamine according to the present disclosure** | 15 | 0 | 0 | 2nd curative |
| JEFFAMINE D230 (branched polyether diamine) | 0 | 15 | 0 | 2nd curative |
| MC 273 (linear polyamidoamine) | 0 | 0 | 15 | 2nd curative |
| Additives | 41 | 41 | 41 | (filler, pigments and 10% wt of toughening agent, 4% wt of cure accelerator; ANCAMINE K54) |
| Total | 100 | 100 | 100 | |

* BAPP adduct = N,N-bis(3-aminopropyl)piperazine] adducted with Epikote 828 in ratio of 200 g BAPP and 80 g Epikote 828.
**Polyether amido polyamine of example CA-1 of EP 2 495 271 A1.

TABLE 3

| Parameter | Example 1 B/A1 | Comparative example 1 B/A2 | Comparative example 2 B/A3 |
|---|---|---|---|
| Overlap shear Strength at RT (Mpa) | 23 | 12 | 23 |
| Gel point at RT (h) | 4 | 8 | 2 |
| Compression molulus at RT (Mpa) | 3000 | 2200 | 2000 |
| Compression modulus at 80° C. (Mpa) | 2100 | 1300 | 1000 |
| Compression modulus at 120° C. (Mpa) | 1000 | 400 | 250 |

The following list of exemplary embodiments is provided to further illustrate the present disclosure with no intention to limit the disclosure to the embodiments listed.

1. Use of a curable composition comprising at least one aromatic epoxy resin and at least one epoxy curative composition as a curable shim for filling gaps between two assembled parts of an assembly, wherein the epoxy curative composition comprises at least a first and a second curative wherein the first curative is selected from a cyclic amine having at least one primary amino ($-NH_2$) group and a second curative selected from at least one polyether polyamine comprising at least one polyether unit and separated therefrom by a linking group at least one polyamine unit and further comprising at least one terminal aminoalkyl residue that is branched and comprises a primary amino group ($-NH_2$) and an alkyl branch in an $\alpha$-, $\beta$- or $\gamma$-position to the primary amino group wherein the alkyl branch contains from 1 to 6 carbon atoms.

2. The use of embodiment 1 wherein the first curative is present in a greater amount by weight than the second curative.

3. The use of anyone of the preceding embodiments wherein the second curative is aliphatic.

4. The use of anyone of the preceding embodiments wherein the second curative is obtainable by a two-step reaction of a polyetheramine with an alkyl acrylate and a polyalkyleneimine, whereas the polyetheramine and the polyalkyleneimine have at least two primary amino group, in which the first step comprises the addition reaction of the polyetheramine to the alkyl acrylate and the second step comprises the reaction of the polyalkyleneimine with the addition product of the first step and wherein, optionally, repeating units may be created by reacting the reaction product with an alkyl acrylate according to the first step and in a further step with a polyalkyleneimine, polyetheramine or a mixture thereof with the proviso that the polyetheramine and polyalkyleneimines are chosen such that the resulting polyether polyamine comprises at least one terminal amino alkyl group that is branched and comprises a primary amino group ($-NH_2$) and contains a $C_1$ to $C_6$ alkyl branch in $\alpha$-, $\beta$- or $\gamma$-position to the primary amino group.

5. The use of any one of the preceding embodiments wherein the second curative has a structure selected from the structures according to formula (III)-(V):

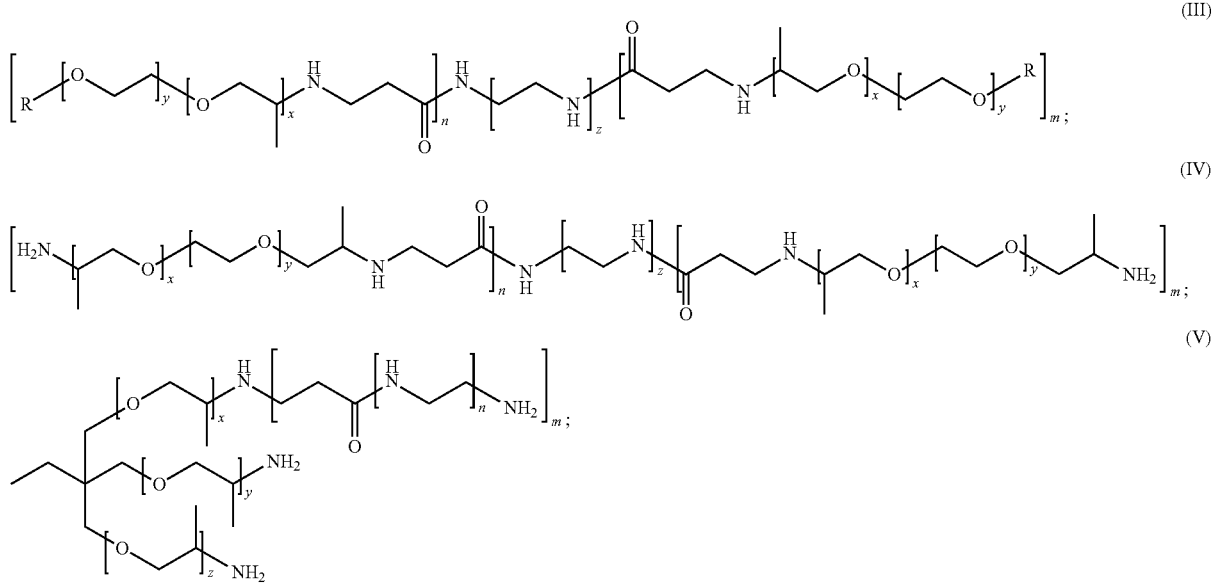

wherein in formula (III) and (IV) x represents an integer from 1-200, y represents an integer from 0-200 and z represents an integer from 1 to 100, R represents independently a single valent primary aminoalkyl rest, wherein at least one residue R is a branched aminoalkyl rest and contains a $C_1$ to $C_6$ alkyl branch in an $\alpha$-, $\beta$- or $\gamma$-position to the primary amino group; m and n are integers including 0 and are meant to indicate that the particular n or m unit may be a repeating unit and wherein in case n or m represent 0, the respective n or m unit is replaced by an H atom and wherein n and m cannot be 0 at the same time.

6. The use of any one of the preceding embodiments wherein the epoxy resin comprises a glycidyl ether selected from glycidyl ethers of bisphenol A, gylcidyl ether of bishpenol F, or a glycidyl ether of tris(hydroxyphenyl)methane and combinations thereof and blends thereof.

7. The use of any one of the preceding embodiments wherein the parts are independently from each other selected from metal parts, or composite parts comprising fibers embedded in a resin matrix.

8. The use of any one of the preceding embodiments wherein the assembly is a component for an airplane.

9. A method of filling at least one residual gap between at least two assembled parts comprising a) providing a curable composition as defined in any one of embodiments 1 to 6; b) applying the curable composition to the gap; c) curing the composition, and, optionally, sanding the cured composition, and, optionally coating the cured composition with a protective coating or a paint.

10. The method of embodiment 9 wherein the parts are independently from each other selected from metal parts, or composite parts comprising fibers embedded in a resin matrix.

11. The method of any one of embodiments 9 or 10 wherein the assembly is a component for or of an airplane.

12. An article comprising an assembly containing at least two assembled parts wherein at least one gap between the assembled parts is filled by a composition obtained by curing the curable composition as defined in any one of embodiments 1 to 6.

13. The article of embodiment 12 being a component of an airplane.

14. The article of embodiment 12 being a component of the wing of an airplane.

15. The article of embodiment 14 being the flap of a wing or a tail fin of an aircraft.

The invention claimed is:

1. A curable composition comprising
at least one aromatic epoxy resin comprising an epoxy novolac, the epoxy novolac comprising a glycidyl ether of a trihydric phenol, and
at least one epoxy curative composition, wherein the epoxy curative composition comprises at least a first and a second curative, wherein the first curative is a cyclic amine having at least one primary amino (—NH₂) group and the second curative is a polyether polyamine comprising
at least one polyether unit and at least one primary amino group separated therefrom by a linking group,
at least one terminal aminoalkyl residue that is branched and comprises a primary amino group (—NH₂), and
an alkyl branch in an α-, β-, γ-position to the primary amino group wherein the alkyl branch contains from 1 to 6 carbon atoms,
wherein the second curative has a structure selected from the structures according to formula (III)-(V):

(III)

[structure]

wherein x represents an integer from 1-200, y represents an integer from 0-200, where at least one of x,y is greater than 1, and z represents an integer from 1 to 100, R represents independently a single valent primary aminoalkyl residue, wherein at least one residue R is a branched aminoalkyl residue and contains a C₁ to C₆ alkyl branch in an α-, β-, or γ-position to the primary amino group; m and n are integers including 0 and are meant to indicate that the particular n or m unit may be a repeating unit and wherein in case n or m represent 0, the respective n or m unit is replaced by an H atom and wherein n and m cannot be 0 at the same time;

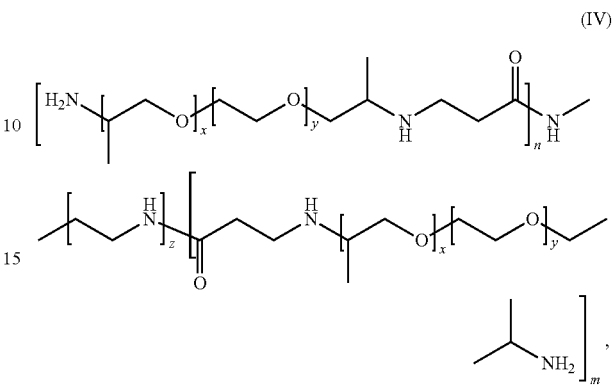

(IV)

wherein x, y, z, m, and n have meanings as described above for formula (III), and

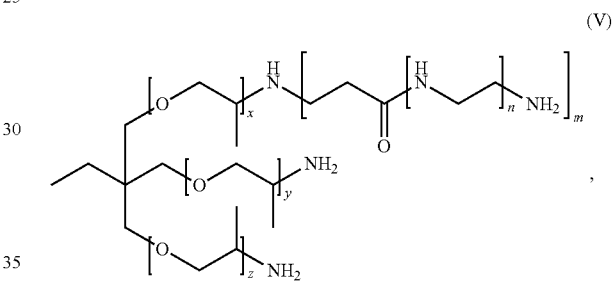

(V)

wherein each of x, y, z is an integer of 0-200 and at least one of y,z is greater than 1, n is an integer of 1-100 and m has a meaning as described above in formula (III), except that m is not 0 and if m is greater than 1 then —NH₂ is replaced in the repeating unit by —NH—.

2. The composition of claim 1 wherein the first curative is present in a greater amount by weight than the second curative.

3. The composition of claim 1 wherein the second curative is obtainable by a two-step reaction of a polyetheramine with an alkyl acrylate and a polyalkyleneimine, whereas the polyetheramine and the polyalkyleneimine have at least two primary amino groups, in which the first step comprises the addition reaction of the polyetheramine to the alkyl acrylate and the second step comprises the reaction of the polyalkyleneimine with the addition product of the first step with the proviso that the polyetheramine and polyalkyleneimines are chosen such that the resulting polyether polyamine comprises at least one terminal amino alkyl group that is branched and comprises a primary amino group (NH₂) and contains a C1 to C6 alkyl branch in an α-, β- or γ-position to the primary amino group.

4. The composition of claim 1, wherein the trihydric phenol is tris(hydroxylphenyl) methane.

5. A curable composition comprising
at least one aromatic epoxy resin comprising an epoxy novolac, the epoxy novolac comprising a glycidyl ether of tris(hydroxylphenyl) methane, and
at least one epoxy curative composition, wherein the epoxy curative composition comprises at least a first and a second curative, wherein the first curative is a cyclic amine having at least one primary amino (—NH$_2$) group and the second curative is a polyether polyamine comprising at least one polyether unit and at least one primary amino group separated therefrom by a linking group, at least one terminal aminoalkyl residue that is branched and comprises a primary amino group (—NH$_2$), and an alkyl branch in an α-, β-, γ-position to the primary amino group wherein the alkyl branch contains from 1 to 6 carbon atoms.

6. The article of claim 5, wherein the second curative has a structure selected from the structures according to formula (III)-(V):

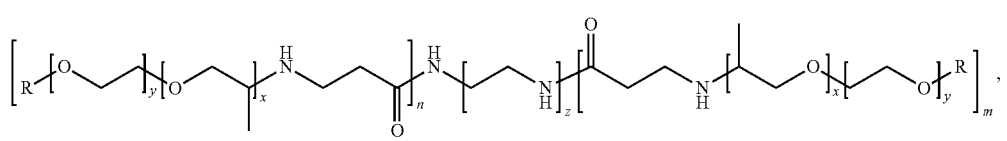

(III)

wherein x represents an integer from 1-200, y represents an integer from 0-200, where at least one of x,y is greater than 1, and z represents an integer from 1 to 100, R represents independently a single valent primary aminoalkyl residue, wherein at least one residue R is a branched aminoalkyl residue and contains a C$_1$ to C$_6$ alkyl branch in an α-, β-, or γ-position to the primary amino group; m and n are integers including 0 and are meant to indicate that the particular n or m unit may be a repeating unit and wherein in case n or m represent 0, the respective n or m unit is replaced by an H atom and wherein n and m cannot be 0 at the same time;

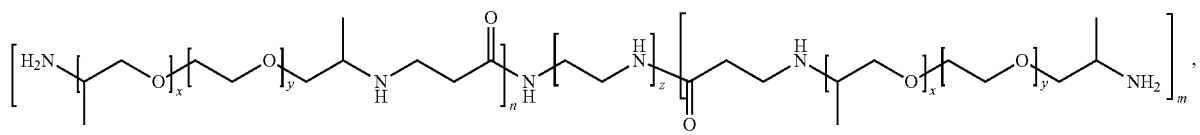

(IV)

wherein x, y, z, m, and n have meanings as described above for formula (III); and

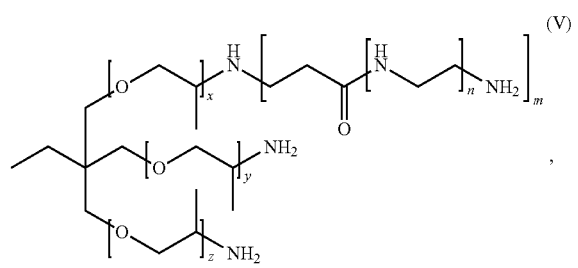

(V)

wherein each of x, y, z is an integer of 0-200 and at least one of y,z is greater than 1, n is an integer of 1-100 and m has a meaning as described above in formula (III), except that m is not 0 and if m is greater than 1 then —NH$_2$ is replaced in the repeating unit by —NH—.

7. The composition of claim 5, wherein the first curative is present in a greater amount by weight than the second curative.

8. The composition of claim 5, wherein the second curative is obtainable by a two-step reaction of a polyetheramine with an alkyl acrylate and a polyalkyleneimine, whereas the polyetheramine and the polyalkyleneimine have at least two primary amino groups, in which the first step comprises the addition reaction of the polyetheramine to the alkyl acrylate and the second step comprises the reaction of the polyalkyleneimine with the addition product of the first step with the proviso that the polyetheramine and polyalkyleneimines are chosen such that the resulting polyether polyamine comprises at least one terminal amino alkyl group that is branched and comprises a primary amino group (NH$_2$) and contains a C1 to C6 alkyl branch in an α-, β- or γ-position to the primary amino group.

9. A method of filling at least one residual gap between at least two assembled parts comprising a) providing a curable composition as defined in claim 1 b) applying the curable composition to the gap and c) curing the composition, and, optionally, sanding the cured composition, and, optionally coating the cured composition with a protective coating or a paint.

10. The method of claim 9 wherein the parts are independently from each other selected from metal parts, or composite parts comprising fibers embedded in a resin matrix.

11. The method of claim 9 wherein the assembled parts are a component for an airplane.

12. An article comprising an assembly containing at least two assembled parts wherein at least one gap between the assembled parts is filled by a composition obtained by curing the curable composition as defined in claim 1.

13. The article of claim 12 being a component of an airplane.

14. The article of claim 13 being a component of a wing of an airplane.

15. The article of claim 13 being a flap of a wing or a tail fin of an aircraft.

16. A method of filling at least one residual gap between at least two assembled parts comprising a) providing a curable composition as defined in claim 5;
b) applying the curable composition to the gap; and
c) curing the composition;
and, optionally, sanding the cured composition, and, optionally coating the cured composition with a protective coating or a paint.

17. The method of claim 16, wherein the parts are independently from each other selected from metal parts, or composite parts comprising fibers embedded in a resin matrix.

18. The method of claim 16, wherein the assembled parts are a component for an airplane.

19. An article comprising an assembly containing at least two assembled parts wherein at least one gap between the assembled parts is filled by a composition obtained by curing the curable composition as defined in claim 5.

20. The article of claim 19 being a component of an airplane.

\* \* \* \* \*